United States Patent
Kohl et al.

(10) Patent No.: US 10,964,460 B2
(45) Date of Patent: Mar. 30, 2021

(54) PTC THERMISTOR MODULE

(71) Applicant: Mahle International GmbH, Stuttgart (DE)

(72) Inventors: Michael Kohl, Bietigheim-Bissingen (DE); Falk Viehrig, Stuttgart (DE); Denis Wiedmann, Wallhausen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/377,859

(22) Filed: Apr. 8, 2019

(65) Prior Publication Data

US 2019/0311824 A1    Oct. 10, 2019

(30) Foreign Application Priority Data

Apr. 9, 2018  (DE) .......................... 102018205280.8

(51) Int. Cl.
  *H01C 7/02*    (2006.01)
  *G05D 23/24*   (2006.01)
  *H01C 1/14*    (2006.01)
  *B60R 16/03*   (2006.01)

(52) U.S. Cl.
  CPC ............ *H01C 7/021* (2013.01); *B60R 16/03* (2013.01); *G05D 23/2401* (2013.01); *H01C 1/1406* (2013.01)

(58) Field of Classification Search
  CPC ........ H01C 7/21; H01C 1/1406; B60R 16/03; G05D 23/2401
  See application file for complete search history.

(56) References Cited

U.S. PATENT DOCUMENTS

| | | | | |
|---|---|---|---|---|
| 4,327,282 A | * | 4/1982 | Nauerth | H05B 3/10 219/505 |
| 5,140,298 A | * | 8/1992 | Gordon | H01C 1/084 174/547 |
| 5,854,471 A | * | 12/1998 | Tadokoro | F24H 3/0429 219/540 |
| 6,922,131 B2 | * | 7/2005 | Walsh | H01C 1/016 337/159 |
| 7,064,301 B2 | * | 6/2006 | Han | F24H 3/0405 219/202 |
| 8,004,385 B2 | * | 8/2011 | Kahr | H01C 1/022 338/22 R |
| 8,421,583 B2 | * | 4/2013 | Koyama | H01C 7/028 338/13 |
| 8,481,899 B2 | * | 7/2013 | Jun | H05B 3/50 219/202 |
| 9,640,352 B2 | * | 5/2017 | Daum | H01C 7/126 |
| 9,693,394 B2 | * | 6/2017 | Sweeney | H05B 3/50 |

(Continued)

*Primary Examiner* — Kyung S Lee
(74) *Attorney, Agent, or Firm* — Fishman Stewart PLLC

(57) ABSTRACT

A PTC thermistor module for a temperature control device may include at least one PTC thermistor element. The PTC thermistor element may include an upper side and an underside facing away from the upper side. The upper side and on the underside may be respectively applied in a heat-exchanging manner with a heat-conducting plate. An edge side, connecting the upper side and the underside with one another in an edge-side manner, of at least one of the PTC thermistor elements, may be applied to a heat-conducting element, which has a thermal conductivity of at least 5 W/mK. A temperature control device may include at least one such PTC thermistor module.

12 Claims, 2 Drawing Sheets

(56) References Cited

U.S. PATENT DOCUMENTS

| | | | |
|---|---|---|---|
| 9,863,663 B2 * | 1/2018 | Kohl | B60H 1/2225 |
| 10,549,604 B2 * | 2/2020 | Min | H05B 3/03 |
| 2009/0314764 A1 * | 12/2009 | Mori | F24H 3/047 |
| | | | 219/520 |
| 2010/0037415 A1 * | 2/2010 | Lansinger | B60H 1/242 |
| | | | 15/250.01 |
| 2012/0061366 A1 * | 3/2012 | Kohl | F24H 3/0429 |
| | | | 219/202 |

* cited by examiner

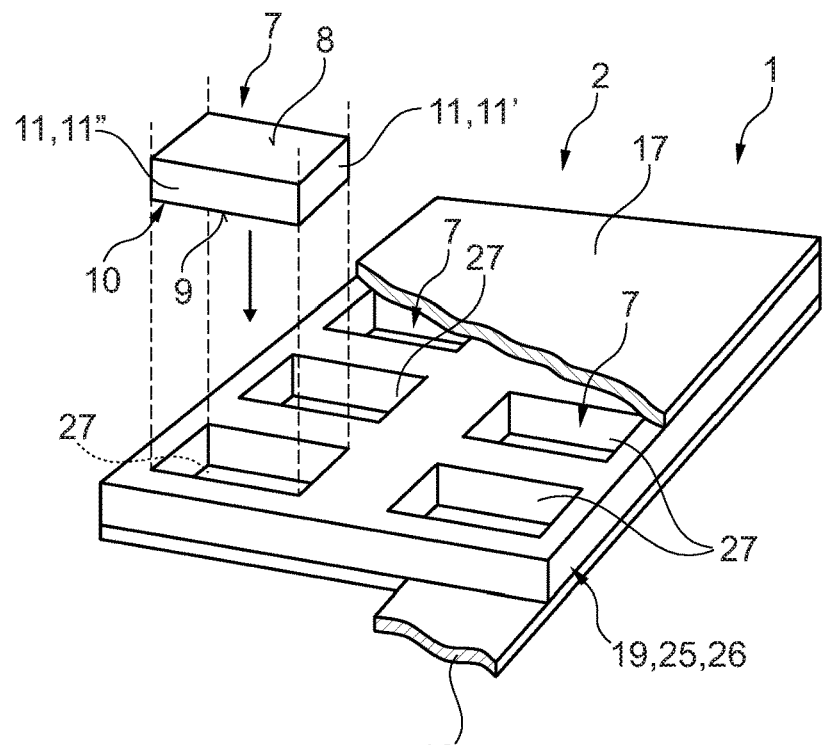
Fig. 5
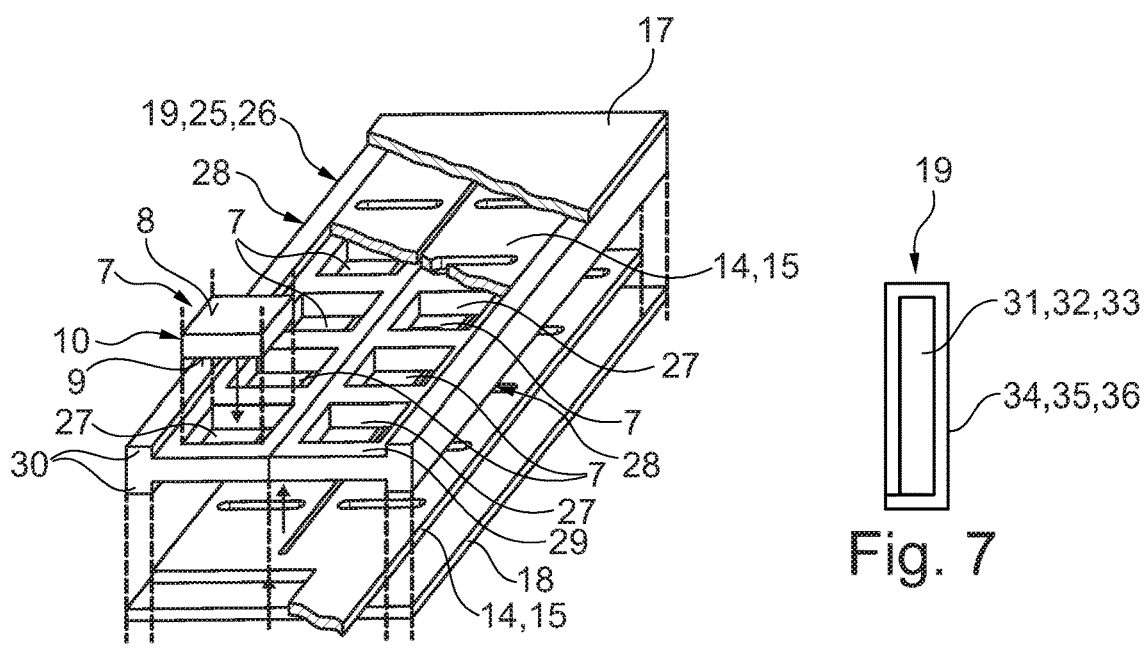
Fig. 6
Fig. 7

PTC THERMISTOR MODULE

CROSS-REFERENCE TO RELATED APPLICATIONS

This application claims priority to German Application DE 10 2018 205 280.8 filed on Apr. 9, 2018, the contents of which are hereby incorporated by reference in its entirety.

TECHNICAL FIELD

The present invention relates to a PTC thermistor module for a temperature control device which has at least one PTC thermistor element. The invention furthermore relates to a temperature control device with at least one such PTC thermistor module.

BACKGROUND

Temperature control devices come into use for controlling the temperature of a fluid or of an object. To generate heat and therefore for heating in the temperature control device, it is known to use PTC thermistor elements, which have an increasing electrical resistance with increasing temperature. Such PTC thermistor elements, also designated as PTC elements, are advantageous in particular owing to their self-regulating characteristic. Such PTC thermistor elements are usually combined in PTC thermistor modules, wherein in the respective module usually a row of PTC thermistor elements is provided, to which an electrical voltage is applied during operation, in order to generate heat within the respective PTC thermistor element. The heat generated in the respective PTC thermistor element is usually discharged via sides of the respective PTC thermistor module facing away from one another, and is used for the purpose of heating in the temperature control device. For this, generally heat-conducting plates come into use, which are in heat-exchanging contact with the sides of the PTC thermistor elements facing away from one other, i.e. for example with an upper side and an underside, facing away therefrom, of the respective PTC thermistor element, and thus discharge the generated heat and make it available for the temperature control device. In such PTC thermistor modules, an increase in efficiency is desirable, which in particular allows the PTC thermistor modules to be constructed more compactly and/or to reduce the energy consumption.

If the PTC thermistor module or respectively the temperature control device is used in a motor vehicle, said requirements are all the greater. In addition, the proportion of electrified vehicles which are at least partially operated electrically is increasing. Hereby, there is an increase on the one hand of the need for PTC thermistor modules, and on the other hand the desire to increase the efficiency of the modules. Furthermore, such vehicles have increasing on-board system voltages, by which also the PTC thermistor modules are operated, so that the requirements for the PTC thermistor modules are also increasing with regard to electrical insulation to the exterior, for example in order to protect objects and/or persons present in the vicinity, and within the PTC thermistor modules, in order to prevent or at least reduce undesired electrical currents, in particular short-circuits.

SUMMARY

The present invention is therefore concerned with the problem of indicating, for a PTC thermistor module with at least one PTC thermistor element and for a temperature control device with at least one such PTC thermistor module, improved or at least alternative embodiments, which are distinguished in particular by an increased efficiency.

This problem is solved according to the invention by the subjects of the independent claims. Advantageous embodiments are the subject of the dependent claims.

The present invention is based on the general idea, in a PTC thermistor module with at least one PTC thermistor element, to use for heat transmission not only sides or respectively faces of the PTC thermistor module facing away from each other, but also other, hitherto free, faces of the PTC thermistor module. Per PTC thermistor module, this leads to an increased area which is used for the heat removal from the respective PTC thermistor module, so that as a whole more heat is transported away and the heating capacity of the PTC thermistor module is improved. Furthermore, hereby an improved heat transport within the PTC thermistor element is achieved, so that the occurrence of so-called exclusion zones, which owing to an excessively high temperature and the positive temperature coefficient of the respective PTC thermistor element prevent or at least reduce an electric flux. This also leads to an increase in efficiency of the PTC thermistor element and therefore of the PTC thermistor module. According to the idea of the invention, the PTC thermistor module has at least one PTC thermistor element, wherein the respective PTC thermistor element, also designated as PTC element, has a positive temperature coefficient, i.e. an increasing electrical resistance with increasing temperature. The respective PTC thermistor element has sides or surfaces facing away from one another, which are also designated below as upper side and underside. The upper side and the underside of the respective PTC thermistor element are connected to one another here by an edge-side and circumferential edge side or side face of the respective PTC thermistor element. The PTC thermistor module has, in addition, an upper heat-conducting plate, which runs along the upper side of the respective PTC thermistor element and is in heat-exchanging contact with the respective upper side. The PTC thermistor module has, in addition, a lower heat-conducting plate, which runs along the underside of the respective PTC thermistor element and is in heat-exchanging contact with the respective underside. According to the invention, at least one heat-conducting element of the PTC thermistor module is provided, which is applied at least partially on the edge side of at least one of the PTC thermistor elements, wherein the heat-conducting element has a thermal conductivity of at least 5 W/mK. This means that a heat exchange takes place between the heat-conducting element and the at least one edge side, so that during operation a removal of heat from the corresponding PTC thermistor element also takes place via the edge side.

Preferably at least one such heat-conducting element is at least partially applied on the edge side of the respective PTC thermistor element.

Applying in the sense of the present invention means here a heat-exchanging, preferably air-free contact between the heat-conducting element and the edge side. This means that the heat-conducting element can lie directly against the edge side, preferably can lie flat. Likewise, a further component of the PTC thermistor module can be arranged between the heat-conducting element and the edge side, wherein this component is air-free, i.e. no air. This component can be, in particular, a connecting component for fixing the heat-conducting element to the PTC thermistor element, therefore in particular an adhesive layer.

The respective heat-conducting plate is generally constructed so as to be continuous or respectively in one piece. It is also conceivable to configure the respective heat-conducting plate so as to have several parts.

The electrical supply of the respective PTC thermistor element takes place advantageously through two electric lines, preferably through two electrodes, which are spaced apart from one another and are in electrical contact with the respective PTC thermistor element. It is advantageous if the lines lie with corresponding portions against the respective PTC thermistor element. It is preferred if the lines lie against the upper side or respectively the underside of the respective PTC thermistor element, advantageously directly. In this case, such a line, in particular such an electrode, is arranged between the upper heat-conducting plate and the respective upper side and/or between the lower heat-conducting plate and the respective underside.

The respective heat-conducing element preferably has a thermal conductivity of at least 20 W/mK. This leads to an improved heat transport between the heat-conducting element and the PTC thermistor element. Embodiments are particularly preferred, in which the respective heat-conducting element has a thermal conductivity between 20 W/mK and 300 W/mK.

Embodiments are advantageous, in which the respective heat-conducting element lies immediately or respectively directly against the associated edge side. Therefore, losses in the heat exchange or respectively in the heat transmission between the heat-conducting element and the edge side are reduced.

The respective PTC thermistor element and therefore the respective edge side can basically have any desired shape. PTC thermistor elements are advantageous which are configured in a parallelepiped shape. This enables, on the one hand, a compact construction of the PTC thermistor module and, on the other hand, a simplified applying of the lines and/or of the heat-conducting plates and/or of the at least one heat-conducting element onto the PTC thermistor element.

The respective heat-conducting element can basically have any desired shape.

In advantageous embodiments, at least one of the heat-conducting elements is in heat-exchanging contact with at least one of the heat-conducting plates, wherein it is preferred if the heat-conducting element lies, in particular directly, against at least one of the heat-conducting plates. The heat which is removed from the edge side of the PTC thermistor element can therefore be transferred via the heat-conducting element onto at least one of the heat-conducting plates, so that the heat-conducting plate also makes available the heat, removed on the edge side, outwards, for example to an associated temperature control device.

Alternatively or additionally, it is conceivable that at least one of the heat-conducting elements is aligned with at least one of the heat-conducting plates. Hereby, it is possible to also make available the heat of the PTC thermistor element, removed on the edge side, at the same side or respectively at the same sides of the PTC thermistor module.

When the PTC thermistor module has several PTC thermistor elements, these are spaced apart from each other.

Embodiments are preferred in which the PTC thermistor module has at least one row of PTC thermistor elements, wherein the respective row comprises at least two PTC thermistor elements spaced apart from one another along the row. The PTC thermistor module has here at least two heat-conducting elements, which run, spaced apart from one another, along one of the rows, wherein the PTC thermistor elements of the row are arranged between the heat-conducting elements. The respective heat-conducting element is applied here on the edge side of the respective PTC thermistor element of the row. Therefore, a compact structure of the PTC thermistor module, with, at the same time, increased efficiency, is possible. Here, the respective heat-conducting element can be configured so as to be elongate, for example as a strip.

Embodiments are preferred in which the PTC thermistor elements of the row are clamped between the associated heat-conducting elements, so that a force-fitting connection is brought about between the PTC thermistor elements and the heat-conducting elements, which fixes the PTC thermistor elements. Therefore, it is possible in particular to dispense with further measures for fixing the PTC thermistor elements within the PTC thermistor module.

In preferred embodiments, at least one heat-conducting element is arranged between PTC thermistor elements which are spaced apart from one another, in particular PTC thermistor elements of a row, wherein the heat-conducting element is applied on the edge side of at least one of the PTC thermistor elements, advantageously of both of the PTC thermistor elements which are spaced apart from one another. Therefore it is possible, in particular in the case of PTC thermistor elements configured in a parallelepiped shape, to use a greater proportion of the edge side of the respective PTC thermistor element for the transmission of heat, and therefore to further increase the efficiency of the PTC thermistor module.

Embodiments are advantageous, in which at least one of the heat-conducting elements is configured as a matrix with at least two mounts, wherein in the respective mount of the matrix an associated PTC thermistor element is received. Hereby, it is possible that the edge side of the respective PTC thermistor element, which is received in the matrix, is entirely surrounded by the matrix. Here, the edge side of the respective PTC thermistor element is applied against the matrix in the mount. Therefore, a heat transmission takes place via the, preferably entire, edge side of the respective PTC thermistor element onto the matrix. Consequently, the efficiency of the PTC thermistor module is improved and/or the mounting of the PTC thermistor module is simplified considerably. In addition, it is therefore possible to realize an interruption-free heat transmission within the matrix, so that the efficiency is further improved.

Embodiments are conceivable, in which the PTC thermistor module has a single such matrix, in which all the PTC thermistor elements are received. This leads to a particularly high efficiency of the PTC thermistor module and/or to a very simple installation of the PTC thermistor module.

The PTC thermistor module is expediently configured such that the flow of an electric current is prevented between the respective PTC thermistor element, in particular the edge side, and the respective heat-conducting element. For this purpose, it is preferred if the respective heat-conducting element is electrically insulating, at least at its outer surface. It is advantageous here if the respective heat-conducting element, at least at its surface, has a specific electrical resistance of at least 108 Ω·cm. This means that at least the contact surface of the respective heat-conducting element, by which the heat-conducting element lies against the at least one edge side, has a specific electrical resistance of at least 108 Ω·cm.

Alternatively or additionally, it is conceivable to provide an electrically insulating layer between the heat-conducting element and the edge side.

Embodiments are advantageous, in which at least one of the heat-conducting elements is made from a ceramic material, in particular consists of ceramic. Therefore, the heat-conducting element has, in addition to an advantageous thermal conductivity, a high specific electrical resistance, and is therefore electrically insulating. Hereby, a direct abutting of the heat-conducting element on the edge side of the PTC thermistor element is possible, so that the heat transmission takes place in a simplified manner and the efficiency is increased. In particular, the respective heat-conducting element can have, preferably consist of, aluminium nitride, boron nitride, aluminium oxide or mixtures thereof.

Embodiments are conceivable in which at least one of the heat-conducting elements has a metallic or metal-containing core, which is electrically conductive. An electrically insulating insulation layer is arranged here between the metallic core and the respective edge side against which the heat-conducting element is applied. The insulation layer is advantageously a component of the heat-conducting element, i.e. the insulation layer at least partially surrounds the metallic core. In particular, the insulation layer is applied externally on the core. However, it is also conceivable to apply the insulation layer on the edge side.

The metallic core can basically be configured as desired. The core can have, for example, a metal sheet, a metal foil, in particular can consist of metal sheet and/or metal foil.

The insulation layer can basically be any desired insulation layer, in so far as it has a specific electrical resistance of at least 108 Ω·cm.

It is conceivable that at least one insulation layer is an oxidation layer. The oxidation layer can be realized here in particular by targeted oxidizing of an outer surface of the metallic core. It is also conceivable that at least one of the insulation layers is a lacquer layer.

The PTC thermistor module can basically have an enveloping body surrounding the heat-conducting plates. The enveloping body leads in particular to a stabilizing of the PTC thermistor module and to a simpler handing thereof. The enveloping body is expediently heat-conducting and advantageously has a thermal conductivity of at least 20 W/mK In particular, the enveloping body can be a metal body. In particular, the enveloping body can be a tubular body. Here, the enveloping body is preferably in direct contact with the heat-conducting plates.

Embodiments are advantageous, in which at least one of the PTC thermistor elements has a ratio between surface and volume which is greater than 0.7.

It is advantageous here if the respective PTC thermistor element has, at least on the upper side and/or on the underside, a length running in longitudinal direction which is greater than its width running transversely to the longitudinal direction. It is advantageous, in addition, if a height running between the underside and the upper side of at least one of the PTC thermistor elements is smaller, in particular five or ten times smaller, than respectively the length and the width.

The PTC thermistor module can basically be used in any desired temperature control device. The temperature control device can be used here for controlling the temperature, in particular for heating, an object or a fluid.

Embodiments are conceivable, in which the temperature control device has a flow chamber which is flowed through by a fluid during operation, wherein the fluid is heated during operation of the PTC thermistor module. The PTC thermistor module is in heat-exchanging contact here with the fluid. It is conceivable that, for this, the PTC thermistor module is arranged directly in the flow chamber and is flowed around by the fluid. Embodiments are conceivable here in which at least one rib structure, which is able to be flowed through, is arranged in the flow chamber, wherein the rib structure is in heat-exchanging contact, preferably on the face side, with the heat-conducting elements of the PTC thermistor module. It is conceivable here that the rib structure is a component of at least one of the PTC thermistor modules.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
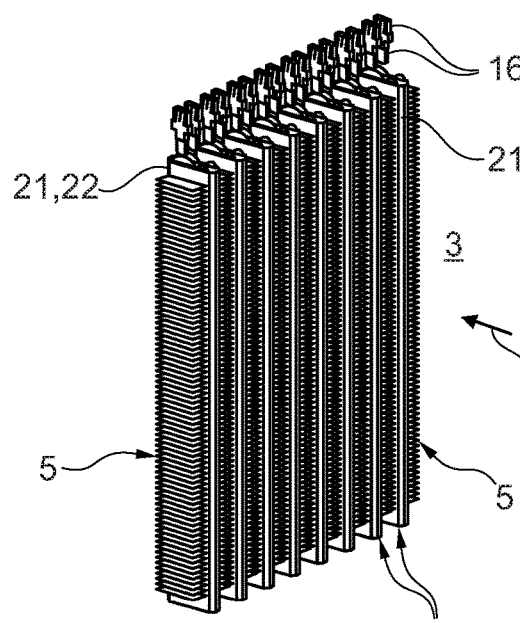
FIG. 1 an isometric interior view of a temperature control device with PTC thermistor modules, FIG. 2 an isometric, partially sectional view of a PTC thermistor module, FIG. 3 an isometric, partially sectional view of the PTC thermistor module in another example embodiment, FIG. 4 an isometric, partially sectional view of the PTC thermistor module in a further example embodiment, FIG. 5 an isometric, partially sectional view of the PTC thermistor module in another example embodiment, FIG. 6 an isometric, partially sectional view, in the manner of an exploded view, of the PTC thermistor module in a further example embodiment, FIG. 7 a cross-section through a heat-conducting element.

A temperature control device 1, as is illustrated in FIG. 1, has at least one PTC thermistor module 2, wherein the example which is shown has several PTC thermistor modules 2, which are arranged spaced apart from one another. The PTC thermistor modules 2 are arranged in a flow chamber 3 of the temperature control device 1, through which a fluid flows along a flow path 4, and therefore flows around the PTC thermistor modules 2. Between the PTC thermistor modules 2, rib structures 5 are arranged, which lie on the face side against the PTC thermistor modules 2 and therefore enlarge a heat-transferring surface within the temperature control device 1. The temperature control device 1 can be used, for example, in a motor vehicle 6, which is otherwise not shown. Heat is generated by the respective PTC thermistor module 2, which heat is emitted to the fluid and thus heats the latter.

Figure 2:
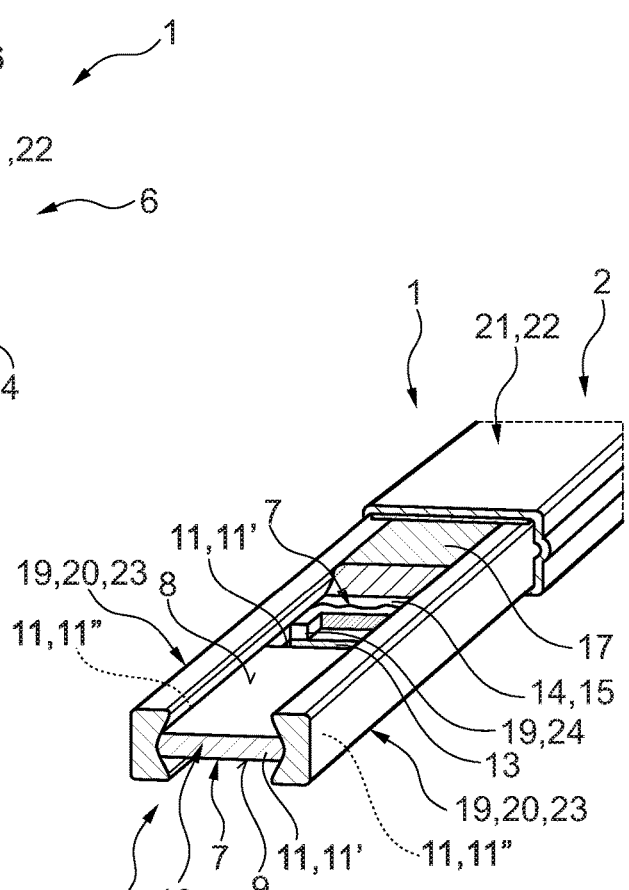

In FIG. 2 an example of one of the PTC thermistor modules 2 is shown. The PTC thermistor module 2 has several PTC thermistor elements 7, also designated as PTC elements 7, which respectively have a positive temperature coefficient, i.e. an increasing electrical resistance with increasing temperature. In the example which is shown, the PTC thermistor elements 7 are configured in a parallelepiped shape and have an upper side 8 and an underside 9 facing away from the upper side 8, which are connected to one another by an external, edge-side and circumferential edge side 10. Through the parallelepiped-shaped configuration of the PTC thermistor element 7, the upper side 8 and the underside 9 are respectively configured in a rectangular manner. In addition, the edge side 10 is composed of rectangular face sides 11. The elongate configuration of the upper side 8 and of the underside 9 leads to the edge side 10 being composed of two short face sides 11' lying opposite one another and two long face sides 11" lying opposite one another. The PTC thermistor elements 7 are arranged in a row 12, wherein successive short face sides 11 of the PTC thermistor elements 7 are spaced apart from one another, so that between adjacent PTC thermistor elements 7 a separation section 13 is arranged. Along the upper side 8 of the PTC thermistor elements 7 an electric line 14 runs, in particular an electrode 15, which lies, preferably directly, against the upper sides 8 and is electrically contacted with the upper sides 8 of the PTC thermistor elements 7. Along the undersides 9 a further electric line 14 runs, in particular an electrode 15, which lies, preferably directly, against the undersides 9 of the PTC thermistor elements 7 and is electrically contacted with the undersides 9. The lines 14 are spaced apart from one another and serve for the electrical supply of the PTC thermistor elements 7. The lines 14 are connected here via connections 16, visible in FIG. 1, to an electrical supplier, which is not shown, for example to an on-board supply system of the motor vehicle 6. The PTC thermistor module 2 has, in addition, an upper heat-conducting plate 17, which extends along the row 12 and therefore the upper sides 8 and is in heat-exchanging contact with the upper sides 8 of the PTC thermistor elements 7. In the example which is shown, the upper heat-conducting plate 17 lies flat against the line 14, which lies against the upper sides 8, so that the line 14 is arranged between the upper sides 8 and the upper heat-conducting plate 17. The PTC thermistor module 2 has, in addition, a lower heat-conducting plate 18 (see FIGS. 3 to 6), which is not illustrated in FIG. 2. The lower heat-conducting plate 18 runs along the row 12 and therefore along the undersides 9 of the PTC thermistor elements 7 and is in heat-exchanging contact with the undersides 9. In the example which is shown, the line 14 is arranged between the lower heat-conducting plate 18 and the undersides 9, wherein the lower heat-conducting plate 18 lies flat against the line 14. In FIG. 2, the upper heat-conducting plate 17 and the line 14, arranged between the upper heat-conducting plate 17 and the upper sides 8, are only illustrated partially here, for better understanding.

The PTC thermistor module 2 has, in addition, at least one heat-conducting element 19, which is applied at least against a portion of one of the edge sides 10, so that the heat-conducting element 19 exchanges heat with the edge side 10. In the example which is shown, two such heat-conducting elements 19 are provided, which extend respectively along the row 12, wherein the PTC thermistor elements 7 are arranged between the heat-conducting elements 19. The heat-conducting elements 19 are configured here in a strip-like manner or as a strip 20. In the example which is shown, the respective heat-conducting element 19 is applied directly against one of the large face sides 11" of the respective PTC thermistor element 7. The heat-conducting element 19 has a thermal conductivity of at least 5 W/mK, preferably at least 20 W/mK, in particular between 20 W/mK and 300 W/mK. In addition, the respective heat-conducting element 19 is expediently electrically insulating, at least at the contact surface with the respective PTC thermistor element 7, having in particular a specific electrical resistance of at least 108 Ω·cm. In the example which is shown, the heat-conducting elements 19 clamp the PTC thermistor elements 7, which are thereby fixed in a force-fitting manner. Consequently, no further fixing of the PTC thermistor elements 7 in the PTC thermistor module 2 is necessary. In the example which is shown, the heat-conducting elements 19 project over the PTC thermistor elements 7 and therefore also surround the lines 14 and the heat-conducting plates 17, 18. Here, the heat-conducting elements 18 align with the heat-conducting plates 17 such that the side of the respective heat-conducting plate 17, 18, facing away from the PTC thermistor elements 7, lies substantially in a plane with the portion of the heat-conducting elements 19 aligned thereto. In the example shown in FIG. 2, the PTC thermistor module 2 has, in addition, an enveloping body 21 which, in addition to the heat-conducting plates 17, 18, also encompasses the heat-conducting elements 19 which are configured as strip 20. The enveloping body 21 is configured as a tubular body 22 made of metal, which lies, preferably directly, against the heat-conducting plates 17, 18 and against the heat-conducting elements 19 configured as strips 20. The heat generated in the respective PTC thermistor element 7 during operation is therefore transferred both via the upper side 8 and the underside 9, and also via the large face sides 11" to the enveloping body 21, which therefore makes the heat available in the temperature control device 1, in order to heat the fluid.

The respective heat-conducting element 19 is preferably made from a ceramic material, in particular consists thereof, is therefore a ceramic strip 23. Preferred ceramic materials are aluminium nitride, boron nitride, aluminium oxide or mixtures therefrom.

It is also conceivable, in at least one of the separation sections 13, preferably in the respective separation section 13, to provide a heat-conducting element 19 which is connected in a heat-exchanging manner with the adjacent edge side 10 of at least one of the PTC thermistor elements 7, in particular lies against it, preferably directly. It is preferred here if the heat-conducting element 19 lies against both adjacent edge sides 10, in the present case therefore against both small face sides 11' adjoining the separation section 13, in particular fills the separation section 13. Said heat-conducting element 19 is advantageously made from a ceramic material, in particular a ceramic, therefore for example a ceramic stone 24, and is merely indicated in FIG. 2. The heat-conducting element 19 arranged in the separation section 13 preferably lies, in addition, preferably directly, against the heat-conducting elements 19 which are configured as a strip 20.

Figure 3:
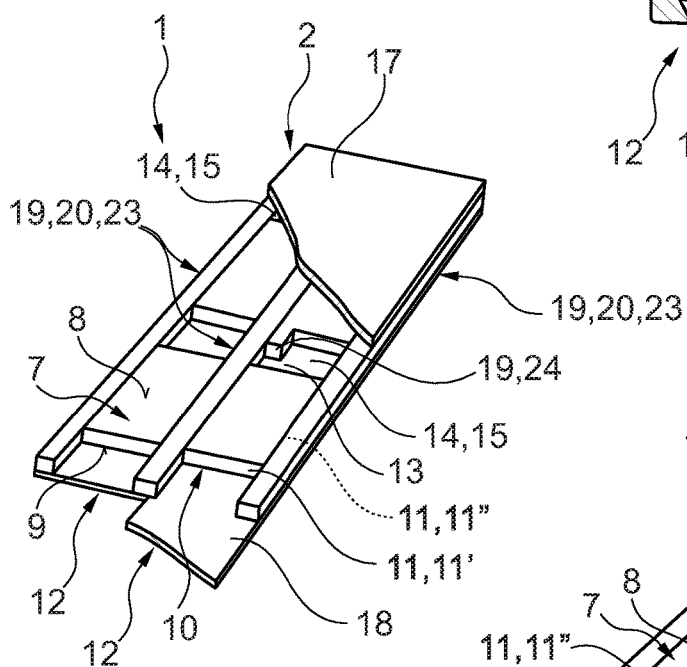

In FIG. 3 another example embodiment of the PTC thermistor module 2 is shown. This example differs from the example shown in FIG. 2 in that two rows 12 of the PTC thermistor elements 7 are provided, wherein these two rows 12 of the PTC thermistor elements 7 are delimited by a total of three heat-conducting elements 19, spaced apart from one another, which are respectively configured as a strip 20, in particular a ceramic strip 23. In addition, the heat-conducting elements 19, configured as strips 20, are dimensioned such that they are aligned with the upper sides 8 and the undersides 9 of the PTC thermistor elements 7, therefore do not project over the latter. The heat-conducting elements 19 configured as strips 20, in particular ceramic strips 23, have a rectangular cross-section here. The upper heat-conducting plate 17 lies here against the upper sides 8 and the sides of the heat-conducting elements 19 aligned thereto, whereas the lower heat-conducting plate 18 lies against the undersides 9 of the PTC thermistor elements 7 and the sides of the heat-conducting elements 19 aligned thereto. In this example embodiment, the heat-conducting module 2 has, in addition, no enveloping body 21, wherein it is also conceivable to provide such an enveloping body 21. In FIG. 3 the upper heat-conducting plate 17 and the lines 14 and the lower heat-conducting plate 18 are respectively illustrated partially and in section for better understanding.

Figure 4:
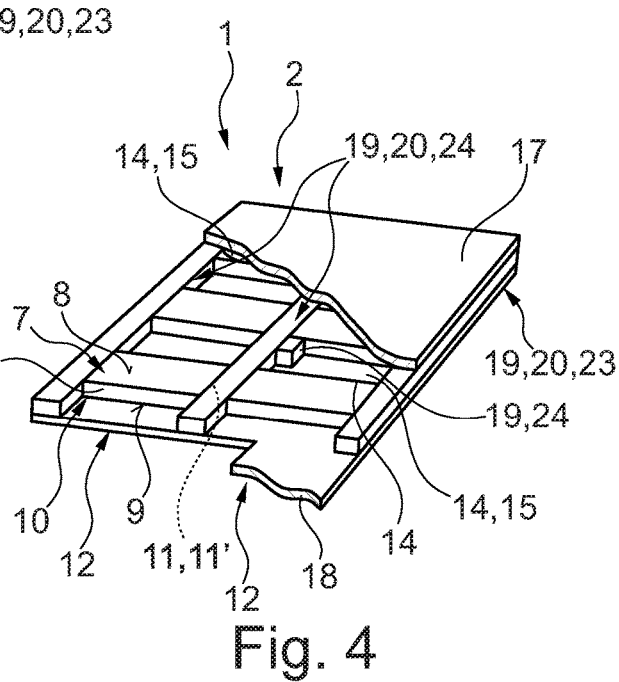

In FIG. 4 a further example embodiment of the PTC thermistor module 2 is illustrated. This example embodiment differs from the example shown in FIG. 3 only in that the large face sides 11" of the PTC thermistor elements 7 of a row 12 are spaced apart from one another and lie opposite one another. Accordingly, the heat-conducting elements 19, configured as strips 20, lie against the short face sides 11' of the PTC thermistor elements 7.

A further example embodiment of the PTC thermistor module 2 is shown in FIG. 5. In this example embodiment, a single heat-conducting element 19 is provided, which is configured as a matrix 25. The heat-conducting element 19 is preferably made from a ceramic material, is therefore in particular a ceramic matrix 26. The matrix 25 has an associated mount 27 for the respective PTC thermistor element 7, in which mount the associated PTC thermistor element 7 is received and is encompassed entirely along the edge side 10. Preferably, the entire edge side 10 of the respective PTC thermistor element 7 in the associated mount 27 lies, preferably directly, against the heat-conducting element 19 which is configured as matrix 25. Here, in FIG. 5, one of the heat-conducting elements 7 is illustrated outside the associated mount 27 and one of the mounts 27 is illustrated entirely empty, i.e. without PTC thermistor element 7, for better understanding. The PTC thermistor module 2 has an upper heat-conducting plate 17 and a lower heat-conducting plate 18, wherein the upper heat-conducting plate 17 and the lower heat-conducting plate 18 lie flat against the electric lines 14, in particular electrodes 15, for the electrical supply of the PTC thermistor elements 17, which are not illustrated in FIG. 5. In the example which is shown, the matrix 25 is aligned with the upper sides 8 and the undersides 9 of the PTC thermistor elements 7. The matrix 25 is, in addition, produced from a single material and in one piece, in particular by a sintering method.

A further example embodiment of the PTC thermistor module 2 is shown in FIG. 6. In this example embodiment, again a single heat-conducting element 19 is provided, which is configured as a matrix 25, in particular ceramic matrix 26. The matrix 25 consists of two matrix halves 28, which respectively receive a row of the PTC thermistor elements 7 and therefore respectively have a row 12 of mounts 27. In the example which is shown, both matrix halves 28 are configured substantially in an identical manner and are arranged mirror-symmetrically, wherein the matrix halves 28 are connected to one another, in particular fastened to one another, between the two rows 12. The respective matrix half 28 has a T-shaped cross-section with a base body 29 and shoulders 30 projecting on both sides to a side of the base body 29, wherein the mounts 27 are formed in the base body 29. Respectively a shoulder 30 of one of the matrix halves 28 forms with the opposite shoulder 30 of the other matrix half 28 a frame in which an electric line 14, in particular electrode 15, is received for the electrical supply of the PTC thermistor elements 7. The upper heat-conducting plate 17 lies here against respectively a shoulder 30 of one of the matrix halves 28 and the line 14, which lies against the upper sides 8 of the PTC thermistor elements 7.

In an analogous manner hereto, the lower heat-conducting plate 18 lies against respectively a shoulder 30 and the line 14, which lies against the undersides 9 of the heat-conducting elements 7. In the example shown in FIG. 6, the PTC thermistor elements 7 are, in addition, configured furthermore in a parallelepiped shape, but all face sides 11 are substantially equal in size. In addition, one of the PTC thermistor elements 7 is illustrated outside the associated mount 27, for better understanding.

In the embodiments shown in FIGS. 5 and 6, the PTC thermistor modules 2 have no enveloping body 21. However, it is also conceivable to provide such an enveloping body 21.

In the examples which are shown, the respective heat-conducting element 19 is made from a ceramic material.

According to FIG. 7, it is also conceivable to produce at least one of the heat-conducting elements 19 from a metallic core 31, for example a metal sheet 32 or metal foil 33, and to provide this externally with an electrically insulating insulation layer 34 which is, for example, an oxidation layer 35 or a lacquer layer 36.

The invention claimed is:

1. A PTC thermistor module for a temperature control device for a motor vehicle, comprising:
   at least one PTC thermistor element, which has an upper side and an underside facing away from the upper side, wherein an edge-side circumferential edge side of the PTC thermistor element connects the upper side and the underside with one another,
   an upper heat-conducting plate, which runs along the upper side of the respective PTC thermistor element and is in heat-exchanging contact with the respective upper side, and
   a lower heat-conducting plate, which runs along the underside of the respective PTC thermistor element and is in heat-exchanging contact with the respective underside,
   wherein on the edge side of at least one of the at least one PTC thermistor elements at least one heat-conducting element is at least partly applied, which has a thermal conductivity of at least 5 W/mK.

2. The PTC thermistor module according to claim 1, wherein at least one of the heat-conducting elements is in heat-exchanging contact with at least one of the heat-conducting plates, in particular lies against at least one of the heat-conducting plates.

3. The PTC thermistor module according to claim 1, wherein at least one of the heat-conducting elements is aligned with at least one of the heat-conducting plates.

4. The PTC thermistor module according to claim 1, wherein at least one row of PTC thermistor elements has at least two PTC thermistor elements spaced apart from one another along the row,
   at least two heat-conducting elements run along one of the rows and spaced apart from one another, wherein the PTC thermistor elements of the row are arranged between the heat-conducting elements, and
   the respective heat-conducting element is applied on the edge side of the respective PTC thermistor element.

5. The PTC thermistor module according to claim 4, wherein between PTC thermistor elements, spaced apart from one another, of at least one of the rows a heat-conducting element is arranged, which is applied on the edge side of at least one of the PTC thermistor elements.

6. The PTC thermistor module according to claim 1, wherein at least one of the heat-conducting elements is configured as a matrix with at least two mounts each of the at least two mounts being configured to receive an associated PTC thermistor element, and the edge side of at least one of the PTC thermistor elements in the associated mount is applied against the matrix.

7. The PTC thermistor module according to claim 1, wherein at least one of the heat-conducting elements is made from a ceramic material.

8. The PTC thermistor module according to claim 1, wherein at least one of the heat-conducting elements has a metallic core, wherein an electrically insulating insulation layer is arranged between the metallic core and the respective edge side, against which the heat-conducting element is applied.

9. The PTC thermistor module according to claim 8, wherein the core has at least one of a metal sheet and a metal foil.

10. The PTC thermistor module according to claim 8, wherein the insulation layer is an oxidation layer or a lacquer layer.

11. The PTC thermistor module according to claim 1, wherein the PTC thermistor module has an enveloping body surrounding the heat-conducting plates.

12. The PTC thermistor module according to claim 1, wherein at least one of the upper side and the underside of at least one of the PTC thermistor elements has a length running in a longitudinal direction, which is greater than its width running transversely to the longitudinal direction.

\* \* \* \* \*